(12) United States Patent
Sasaki et al.

(10) Patent No.: US 7,638,580 B2
(45) Date of Patent: Dec. 29, 2009

(54) GOLF BALL

(75) Inventors: Takashi Sasaki, Kobe (JP); Kazuhiko Isogawa, Kobe (JP)

(73) Assignee: SRI Sports Limited, Kobe (JP)

( * ) Notice: Subject to any disclaimer, the term of this patent is extended or adjusted under 35 U.S.C. 154(b) by 204 days.

(21) Appl. No.: 11/342,655

(22) Filed: Jan. 31, 2006

(65) Prior Publication Data

US 2006/0178471 A1    Aug. 10, 2006

(30) Foreign Application Priority Data

Feb. 9, 2005    (JP)    ............................. 2005-033594

(51) Int. Cl.
  *A63B 37/00*    (2006.01)
  *C09D 133/06*    (2006.01)
  *C09D 133/14*    (2006.01)
  *C09D 167/00*    (2006.01)

(52) U.S. Cl. ........................ 525/127; 525/123; 525/131; 525/440.01; 525/440.11; 524/507; 524/539; 473/351; 473/371

(58) Field of Classification Search ........................ None
See application file for complete search history.

(56) References Cited

U.S. PATENT DOCUMENTS

| | | | | |
|---|---|---|---|---|
| 4,871,589 A | * | 10/1989 | Kitaoh et al. | ................ 427/322 |
| 5,108,653 A | * | 4/1992 | Taylor | ........................ 516/71 |
| 5,834,555 A | * | 11/1998 | Meisenburg et al. | ......... 524/591 |
| 5,856,014 A | | 1/1999 | Imashiro et al. | |
| 6,255,382 B1 | * | 7/2001 | Hamada et al. | .............. 524/591 |
| 6,509,410 B2 | | 1/2003 | Ohira et al. | |
| 2001/0034398 A1 | | 10/2001 | Ohira et al. | |
| 2004/0116623 A1 | * | 6/2004 | Isogawa et al. | .............. 525/453 |

FOREIGN PATENT DOCUMENTS

| | | |
|---|---|---|
| JP | 8-71177 A | 3/1996 |
| JP | 2573966 B2 | 10/1996 |
| JP | 9-235508 A | 9/1997 |
| JP | 11-146930 A | 6/1999 |
| JP | 2001-271027 A | 10/2001 |
| JP | 2003-119677 A | 4/2003 |

* cited by examiner

*Primary Examiner*—David Buttner
(74) *Attorney, Agent, or Firm*—Birch, Stewart, Kolasch & Birch, LLP

(57) ABSTRACT

The object of the present invention is to provide a golf ball having a paint film which is obtained from an environment-friendly aqueous paint and is excellent in the impact-resistance and the wear-resistance. The present invention provides a golf ball having a paint film on a surface of a golf ball body, wherein the paint film is obtained by curing a paint composition comprising an aqueous polyol having a carboxyl group, an aqueous polycarbodiimide, and an aqueous polyisocyanate.

15 Claims, No Drawings

GOLF BALL

BACKGROUND OF THE INVENTION

1. Field of the Invention

The present invention relates to a golf ball, more particularly to a golf ball having a paint film.

2. Description of the Related Art

A conventional golf ball has a paint film on the surface of the golf ball body. The paint film is formed to prevent the deterioration of the golf ball body due to the exposure of the sun light and the weather, as well as impart a gloss to the golf ball body, thereby improving the appearance thereof.

It is required for the paint film to have a durable adhesion against the impact, since the golf ball is repeatedly used and hit. Especially, since hitting the golf ball deforms the golf ball body, the paint film is likely to peel off in the case that the paint film covering the golf ball body does not follow the deformation of the golf ball body. In addition, the paint film may peel off when the golf ball is subject to the friction against the golf clubs when hitting the golf ball, and against the ground surfaces such as sand of bunker and rough when landing on the ground.

As a paint film of the golf ball, a polyurethane paint film is preferably used. For example, Japanese patent publication No. H11-146930 A discloses a polyurethane paint for the golf ball, which paint comprises a polyol containing a polyurethane polyol as a base resin and a polyisocyanate as a curing agent. Japanese patent No. 2573966 discloses a process for preparing a golf ball which process comprises coating a solution of ethyleneimine or a derivative of a carbodiimide to a golf ball having an ionomer resin cover, and then coating a polyurethane paint.

In recent years, it has been expected to reduce the usage of the solvent-borne paint in view of the environmental issues, and an aqueous paint has been studied to replace the solvent-borne paint used for the golf ball. For example, Japanese patent publication No. H08-71177 A discloses a golf ball where an aqueous polyurethane dispersion having a carboxyl group crosslinked with a carbodiimide compound is painted.

SUMMARY OF THE INVENTION

However, the paint film made from the aqueous paint used for the golf ball is not sufficient in terms of the durable adhesion. The present invention has been achieved in view of the above circumstances. The object of the present invention is to provide a golf ball having a paint film which is obtained from an environment-friendly aqueous paint and is excellent in the durable adhesion.

The present invention provides a golf ball comprising a golf ball body, and a paint film covering the golf ball body, wherein the paint film is obtained by curing a paint composition comprising an aqueous polyol having a carboxyl group, an aqueous polycarbodiimide, and an aqueous polyisocyanate.

In the present invention, during curing the above paint composition, the hydroxyl group of the aqueous polyol reacts with the isocyanate group of the aqueous polyisocyanate, and the carboxyl group of the aqueous polyol reacts with the carbodiimide group of the aqueous polycarbodiimide, and thus the resultant paint film has an excellent durability, due to the multi-crosslinked structure. Further, coating and curing the above paint composition on the surface of the golf ball allow the isocyanate group of the aqueous polyisocyanate or the carbodiimide group of the aqueous polycarbodiimide to further react with the functional group existing on the surface of the golf ball. As a result, the chemical bond is formed between the paint film and the golf ball, and therefore the durable adhesion will be increased.

DESCRIPTION OF THE PREFERRED EMBODIMENT

The golf ball of the present invention has a golf ball body, and a paint film covering the golf ball body, wherein the paint film is obtained by curing a paint composition comprising an aqueous polyol having a carboxyl group, an aqueous polycarbodiimide, and an aqueous polyisocyanate.

In the followings, the paint composition used in the present invention, comprising the aqueous polyol having the carboxyl group, the aqueous polyisocyanate, and the aqueous polycarbodiimide will be explained. In the present invention, "aqueous" includes both "water soluble" and "water dispersible".

(1) Aqueous Polyol Having the Carboxyl Group (Hereinafter, Referred to as Just "Aqueous Polyol" in Some Cases in the Present Invention)

The aqueous polyol having the carboxyl group is not limited, as long as the polyol is aqueous and has at least two hydroxyl groups and at least one carboxyl group in its molecule. Examples of the aqueous polyol are an aqueous polyester polyol, an aqueous urethane polyol, an aqueous acrylic polyol, an aqueous alkyd resin, and a cellulose derivative such as a carboxyl methylcellulose. The above aqueous polyol can be used individually or in combination of at least two of them.

Among them, it is even more preferable to use the aqueous polyester polyol or the mixture of the aqueous polyester polyol and the aqueous acrylic polyol, because the aqueous polyester polyol improves the impact-resistance of the resulting urethane paint film and the aqueous acrylic polyol improves the weather resistance. More preferably, the aqueous polyol is the mixture of the aqueous polyester polyol and the aqueous acrylic polyol at the mass ratio of the aqueous polyester polyol:the aqueous acrylic polyol=4:1 to 10:1, since the resultant film is excellent in both mechanical properties and weather resistance.

As described above, the aqueous polyester polyol having the carboxyl group includes a water-soluble polyester polyol and a water dispersible polyester polyol which will be soluble or dispersible into water by neutralizing the carboxyl group with a base. The aqueous polyester polyol having the carboxyl group can be produced, according to the method well-known for producing the conventional polyester polyol. For example, the aqueous polyester polyol can be obtained by the polycondensation between a (low molecular weight) polyol and a polybasic acid.

The carboxyl group of the aqueous polyester polyol can be introduced from either the polyol component or the polybasic acid component. A polyol component for introducing the carboxyl group into the polyester polyol includes, for example, dimethylol propionic acid, dimethylol butanoic acid, dihydroxyl propionic acid, or dihydroxyl succinic acid. The polyol component, other than the polyol component for introducing the carboxyl group, includes a well known polyol for preparing the polyester polyol. Examples of the well known polyol are a diol such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexanediol, and bisphenol A; or a triol such as glycerin and trimethylol propane. The above polyol can be used individually or in combination of at least two of them.

The polybasic acid component for introducing the carboxyl group into the polyester polyol includes, for example, trimellitic anhydride and pyromellitic anhydride. The polybasic acid, other than the polybasic acid for introducing the carboxyl group, includes a well known polybasic acid for preparing the polyester polyol. Examples of the well known polybasic acid are a dibasic acid such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephtalic acid, isophtalic acid, 1,4-naphtalenedicarboxylic acid, 2,5-naphtalenedicarboxylic acid, 2,6-naphtalenedicarboxylic acid, naphtalic acid (1,8-naphtalenedicarboxylic acid), and biphenyldicarboxylic acid. The above polybasic acid can be used individually or in combination of at least two of them.

The aqueous urethane polyol having the carboxyl group is not limited, as long as it has a urethane bond, at least one carboxyl group, and at least two hydroxyl groups in the molecular chain thereof. For example, the aqueous urethane polyol can be obtained by reacting the above aqueous polyester polyol having the carboxyl group with the polyisocyanate in such a molar ratio that the hydroxyl group of the polyol component is excess to the isocyanate group of the polyisocyanate.

The aqueous acrylic polyol having the carboxyl group includes, for example, an aqueous acrylic polyol where a (meth)acrylate having a hydroxyl group and an ethylenically unsaturated carboxylic acid such as (meth)acrylic acid, maleic acid, and itaconic acid are copolymerized.

Examples of the (meth)acrylate having the hydroxyl group are 2-hydroxyethyl (meth)acrylate, hydroxypropyl (meth)acrylate. Examples of the other monomer component which may be copolymerized into the acrylic polyol are well-known ethylenically unsaturated monomer such as methyl (meth)acrylate, ethyl (meth)acrylate, isopropyl (meth)acrylate, n-butyl (meth)acrylate.

The preparation of the aqueous acrylic polyol is not limited, and is conducted by, for example, copolymerizing the ethylenically unsaturated monomer having the carboxyl group and the (meth)acrylate having the hydroxyl group, and neutralizing the carboxyl group with the base, or by emulsion-polymerizing in the presence of a surfactant, or soap-free polymerizing the (meth)acrylate having the hydroxyl group and the ethylenically unsaturated carboxylic acid.

The aqueous polyol having the carboxyl group preferably has hydroxyl value of not less than 25 mgKOH/g, more preferably not less than 30 mgKOH/g, and preferably has hydroxyl value of less than 100 mgKOH/g, more preferably not more than 95 mgKOH/g. If the aqueous polyol has hydroxyl value of less than 25 mgKOH/g, the adhesion between the paint film and the golf ball body may be lowered in some cases. While if the aqueous polyol has hydroxyl value of 100 mgKOH/g or more, the curing reaction with the aqueous polyisocyanate takes longer time, resulting in the lower productivity. The hydroxyl value is determined, for example, by the potentiometric titration, according to JIS-K1557.

The aqueous polyol having the carboxyl group preferably has an acid number of 10 mgKOH/g or more, more preferably 15 mgKOH/g or more, even more preferably 20 mgKOH/g or more, and preferably has an acid number of 50 mgKOH/g or less, more preferably 45 mgKOH/g or less, even more preferably 40 mgKOH/g or less. If the acid value is less than 10 mgKOH/g, the amount of the hydrophilic group (carboxyl group) is too little, thus the dispersibility or the solubility into water is lowered, while if the acid value is more than 50 mgKOH/g, the amount of the hydrophilic group (carboxyl group) is too large, thus the water resistance of the resultant paint film becomes low.

The aqueous polyol having the carboxyl group preferably has a weight average molecular weight of 4,000 or more, more preferably 5,000 or more, even more preferably 6,000 or more, and preferably has a weight average molecular weight of 20,000 or less, more preferably 17,000 or less, even more preferably 15,000 or less. If the weight average molecular weight is less than 4,000, it takes longer time to dry the paint, resulting in the lower productivity, while if the weight average molecular weight is more than 20,000, the hydroxyl value becomes relatively low, thus the adhesion between the paint film and the golf ball body will be lowered in some cases. The molecular weight of the aqueous polyol is determined by Gel permeation chromatography using polystyrene as a standard material.

The preparation of the aqueous polyol liquid is not limited, and is conducted by, for example, neutralizing the carboxyl group with the base. The base for neutralizing the carboxyl group includes, for example, a primary amine such as ammonia, methylamine, and ethylamine; a secondary amine such as diethanol amine, dimethyl amine, and diethyl amine; a tertiary amine such as triethyl amine and triethanol amine; and a hydroxide of alkali metal such as sodium hydroxide and potassium hydroxide.

In the present invention, the aqueous polyol having the carboxyl acid is preferably used in the form of the liquid where the aqueous polyol is dispersed or dissolved into the water. The aqueous polyol liquid preferably has the concentration of 20 mass % or more, more preferably 25 mass % or more, while preferably has the concentration of 65 mass % or less, more preferably 60 mass % or less. If the concentration is less than 20 mass %, the curing reaction between the aqueous polyol and the aqueous polyisocyanate or the aqueous polycarbodiimide tends to be slow. If the concentration is more than 65 mass %, the viscosity will be higher, resulting in the lower painting-workability.

(2) Aqueous Polyisocyanate

The aqueous polyisocyanate used in the present invention is not limited, as long as the polyisocyanate is modified to be aqueous (water soluble or water dispersible). Examples of the aqueous polyisocyanate include an aqueous polyisocyanate modified with polyoxyalkylene ether alcohol.

The polyisocyanate component constituting the aqueous polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI) 1,5-naphthylene diisocyanate (NDI), 3,3'-bitolylene-4,4'-diisocyanate (TODI), xylylene diisocyanate (XDI), tetramethylxylylenediisocyanate (TMXDI) and para-phenylene diisocyanate (PPDI); and an alicyclic or aliphatic polyisocyanate such as 4,4'-dicyclohexylmethane diisocyanate (hydrogenated MDI), hydrogenated xylylenediisocyanate ($H_6$XDI) hexamethylene diisocyanate (HDI), and isophorone diisocyanate (IPDI). The polyisocyanate can be used either alone or in combination of two or more. Among them, non-yellowing type polyisocyanate (TMXDI, XDI, HDI, $H_6$XDI, IPDI, $H_{12}$MDI) are preferable in view of weather resistance, and the aqueous hexamethylene diisocyanate is more preferable. Specific examples of the aqueous polyisocyanate are CR-60N available from DAINIPPON INK AND CHEMICALS, INC., Coronate C3062, C3053 available from NIPPON POLYURETHANE INDUSTRY, and Bayhdur 3100 available from SUMITOMO BAYER URETHANE, and I-3 available from SHINTO PAINT.

The mixing ratio (NCO/OH) of the aqueous polyisocyanate to the aqueous polyol used for the paint composition in the present invention is not limited. NCO/OH (molar ratio) is preferably not less than 1.1, more preferably not less than 1.2, even more preferably not less than 1.3, while the NCO/OH (molar ratio) is preferably not more than 2.0, more preferably not more than 1.8, even more preferably not more than 1.7. If NCO/OH (molar ratio) is less than 1.1, the curing reaction tends to be insufficient. The insufficient curing reaction causes the tackiness of the resulting paint film, thus the dust and the dirt tend to adhere to the resultant paint film. While if the molar ratio of NCO/OH is greater than 2.0, the residual isocyanate group tends to react with moisture, thereby generating $CO_2$. As a result, the air bubble tends to be contained in the paint film.

(3) Aqueous Polycarbodiimide

The aqueous polycarbodiimide used in the present invention is aqueous (water soluble or water dispersible) and has at least two carbodiimide groups in a molecular thereof. Preferably used is an aqueous polycarbodiimide resin. The aqueous polycarbodiimide resin includes, for example, a resin having a hydrophilic segment and a segment comprising a repeating unit having a carbodiimide group, as depicted by the following formula (1).

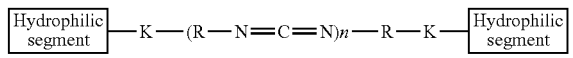

(1)

The aqueous polycarbodiimide resin represented by the above chemical formula (1) is obtained by using diisocyanate as a starting material. In formula (1), R is a residue where isocyanate groups are removed from diisocyanate. K means a bond formed by a reaction of isocyanate group and a hydrophilic segment. "n" means an average degree of polymerization and is an integer ranging from 2 to 100. Example of the hydrophilic segment in Formula 1, includes a nonionic segment having an ethylene oxide chain, an anionic hydrophilic segment comprising a sulfonate, sulfate, and the like, or a cationic segment comprising a quaternary ammonium salt. Specific examples of the aqueous polycarbodiimide resin represented by Formula (1) are aqueous tetramethyl xylylene carbodiimide, and aqueous dicyclohexylmethane carbodiimide.

The aqueous polycarbodiimide preferably has a carbodiimide equivalent of 100 or more, more preferably 150 or more, even more preferably 200 or more, and preferably has a carbodiimide equivalent of 600 or less, more preferably 550 or less, even more preferably 500 or less. The aqueous polycarbodiimide having the carbodiimide equivalent of 100 or more enhances the crosslinking density in the resultant paint film and provides the resultant paint film with the higher durability. While the aqueous polycarbodiimide having the carbodiimide equivalent of 600 or less enhances the reactivity to shorten the time necessary for the crosslinking reaction with the aqueous polyurethane having the carboxyl group. Herein, "carbodiimide equivalent" means a chemical formula weight (molecular weight) per one molar carbodiimide group of the aqueous polycarbodiimide.

In the present invention, the aqueous polycarbodiimide is preferably used in the form of an aqueous liquid such as an aqueous solution or an aqueous dispersion where the aqueous polycarbodiimide component is dissolved or dispersed into water respectively. The solid content (mass %) of the aqueous liquid is, without limitation, preferably 20 mass % or more, more preferably 30 mass % or more, and preferably 80 mass % or less, more preferably 70 mass % or less. Examples of the aqueous liquid of the aqueous polycarbodiimide resin are "Carbodilite E-01, E-02, and E-03A (nonionic, solid content 40 mass %) available from NISSHINBO INDUSTRIES, INC.

In the paint composition used for the present invention, the blending ratio of the aqueous polycarbodiimide to the aqueous polyol having the carboxyl group is, without limitation, preferably 0.1 or more, more preferably 0.2 or more, even more preferably 0.3 or more, and preferably 1.5 or less, more preferably 1.2 or less, even more preferably 1.0 or less, most preferably 0.8 or less, at a molar ratio of carbodiimide group to the carboxyl group (—N═C═N—)/(—COOH).

The blending ratio of 0.1 or more provides the resultant paint film with the higher crosslinking density and thus improves the durable adhesion. On the other hand, if the blending ratio is more than 1.5, the resultant paint film has a lower degree of durable adhesion and tackiness, due to the excess amount of the aqueous polycarbodiimide.

The paint composition used for the present invention may further include an organic solvent in addition to the above aqueous polyol having the carboxyl group, the aqueous polyisocyanate and the aqueous polycarbodiimide, since the organic solvent improves the mutual dispersibility between the aqueous polyol, the aqueous polyisocyanate and the aqueous polycarbodiimide, thereby promoting the curing reaction. The organic solvent includes, for example, acetone, methyl ethyl ketone, ethyl acetate, N,N-dimethylformamide, N-metylpyrrolidone, and methoxybutyl acetate. As the above organic solvent, it is preferable to use so called "film forming additive". The film forming additive can enhance the film forming ability of the paint film, thereby improving the properties of the resultant paint film. Further, since the film forming additive is less volatile, it is possible to reduce the amount of the volatile organic solvent.

Examples of the film forming additive are a glycolic ether type of the film forming additive such as ethyleneglycol monomethylether, ethyleneglycol monoethylether, ethyleneglycol monobutylether, ethyleneglycol monohexylether, ethyleneglycol 2-ethylhexylether, propyleneglycol butylether, dipropyleneglycol butylether, diethyleneglycol monoethylether, and diethyleneglycol monobutylether; a glycolic ester type of the film forming additive such as ethyleneglycol monomethylether acetate, ethyleneglycol monoethylether acetate, propyleneglycol monomethylether acetate, diethyleneglycol monoethylether acetate, and diethyleneglycol monobutylether acetate. The above organic solvent and the film forming additive can be used either alone or in combination of at least two of them.

The amount of the organic solvent contained in the paint composition is preferably 30 mass % or less, more preferably 20 mass % or less, even more preferably 10 mass % or less. Because the use in an amount of more than 30 mass % does not meet the object to reduce the volatile component and decrease the environmental burdens.

The organic solvent or the film forming additive may be added to any one of the aqueous polyol, the aqueous polyisocyanate, and the aqueous polycarbodiimide, but the aqueous polyisocyanate is preferably used in the form of being dissolved or dispersed into the organic solvent or the film forming additive.

The paint composition used in the present invention may further include an additive such as a pigment, an UV absorber, an antioxidant, a light-stabilizer, a fluorescent brightener, an anti-blocking agent, a leveling agent, and a slipping agent, which are conventionally used for the golf ball paint, where necessary.

The golf ball of the present invention has no limitation on its structure of the golf ball body, and includes a one-piece golf ball, a two-piece golf ball, a multi-piece golf ball comprising at least three layers, and a wound-core golf ball. The present invention can be applied to all types of the golf ball. Among them, preferred is a golf ball body comprising a cover such as the two-piece golf ball, the multi-piece golf ball, and the wound-core golf ball, wherein a resin component constituting the cover preferably comprises a resin having a urethane bond or a carboxyl group. In the case that the resin component constituting the cover has a carboxyl group, the aqueous polycarbodiimide react with both the carboxyl group of the resin constituting the cover and the carboxyl group of the aqueous polyol constituting the resin component of the paint film. Thus, the cover and the paint film are bonded via a chemical bond. As a result, the adhesion of the paint film to the cover is getting higher. On the other hand, in the case that the resin constituting the cover is the resin having the urethane bond, since the hydrogen bond is formed between the urethane bond of the polyurethane backbone constituting the paint film and the urethane bond of the resin constituting the cover, the adhesion of the paint film to the cover is getting higher.

As the resin having the carboxyl group, an ionomer resin is preferably used. Examples of the ionomer resin are one prepared by neutralizing at least a part of carboxyl groups in a copolymer composed of ethylene and α,β-unsaturated carboxylic acid with a metal ion, and one prepared by neutralizing at least a part of carboxyl groups in a terpolymer composed of ethylene, α,β-unsaturated carboxylic acid and α,β-unsaturated carboxylic acid ester with a metal ion. Examples of the α,β-unsaturated carboxylic acid are acrylic acid, methacrylic acid, fumaric acid, maleic acid, and crotonic acid. Acrylic acid and methacrylic acid are preferable. Examples of the α,β-unsaturated carboxylic acid ester are methyl ester, ethyl ester, propyl ester, n-butyl ester, isobutyl ester and the like of acrylic acid, or methacrylic acid. Especially, the ester of acrylic acid or methacrylic acid are preferable.

The metal ion for neutralizing at least a part of the carboxyl groups includes an alkali metal ion such as sodium, potassium, and lithium; a divalent metal ion such as magnesium, calcium, zinc, barium, and cadmium; a trivalent metal ion such as aluminum, or other metal ions such as tin, and zirconium. Among them, sodium, zinc, and magnesium are preferably used.

Examples of the ionomer resin are, but not limited to, HIMILAN 1555, HIMILAN 1557, HIMILAN 1605, HIMILAN 1652, HIMILAN 1702, HIMILAN 1705, HIMILAN 1706, HIMILAN 1707, HIMILAN 1855, HIMILAN 1856 available from MITSUI-DUPONT POLYCHEMICAL CO.; IOTEK 8000, IOTEK 7010 available from Exxon Co.; SURLYN 8945, SURLYN 9945, SURLYN AD8511, SURLYN AD8512, SURLYN AD8542 available from DUPONT CO. These ionomers may be used individually or as a mixture of two or more of them.

The resin having the urethane bond comprises polyurethane having a plurality of urethane bonds in the molecule thereof. The polyurethane is, for example, a reaction product obtainable by reacting a polyisocyanate with a polyol, if necessary, by further reacting with a polyamine. The polyurethane includes a thermoplastic polyurethane and a thermosetting polyurethane.

The thermoplastic polyurethane is not limited, as long as it can be molded into the cover by injection-molding or compression molding. Examples of the thermoplastic polyurethane are "ELASTOLLAN XNY 90A", "ELASTOLLAN XNY 97A", and "ELASTOLLAN XNY585" available from BASF POLYURETHANE ELASTOMERS.

In one preferred embodiment of the present invention, the thermosetting polyurethane is used as the resin constituting the cover. The thermosetting polyurethane generates many three dimensional crosslinking points, and thus the cover excellent in durability is obtained. The thermosetting polyurethane includes, for example, a type where the isocyanate group terminated urethane prepolymer is cured with a curing agent such as a polyamine and a polyol and a type where the hydroxyl group or amino group terminated urethane prepolymer is cured with a curing agent such as a polyisocyanate.

The resin component constituting the cover may further include a thermoplastic elastomer, a diene type block copolymer and the like in addition to the above polyurethane or the ionomer resin. Examples of the thermoplastic elastomer are a polyamide elastomer having a commercial name "PEBAX", for example "PEBAX 2533", available from ARKEMA Inc, a polyester elastomer having a commercial name of "HYTREL", for example "HYTREL 3548", "HYTREL 4047", available from DU PONT-TORAY Co, a polyurethane elastomer having a commercial name "ELASTOLLAN", for example "ELLASTOLLAN ET880" available from BASF POLYURETHANE ELASTOMERS Co.

The cover may further include a pigment such as zinc oxide, titanium oxide, and a blue pigment; a gravity adjusting agent such as barium sulfate and calcium carbonate; a dispersant, an antioxidant, an ultraviolet absorber, a light stabilizer, a fluorescent material, and a fluorescent brightener in addition to the above resin component, unless they impart any undesirable property to the cover.

In the following, a core of the wound-core golf ball, the two-piece golf ball, and the multi-piece golf ball or one-piece golf ball body will be explained. The conventional rubber composition can be used for the core and the one-piece golf ball body. For example, the core or the one-piece golf ball body can be molded by heat-pressing the rubber composition comprising a diene rubber as a base rubber, a co-crosslinking agent, and a crosslinking initiator.

Examples of the diene rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%.

The co-crosslinking agent used in the present invention includes, for example, an α,β-unsaturated carboxylic acid or a metal salt thereof. Typically preferred is the α,β-unsaturated carboxylic acid having 3 to 8 carbon atoms such as acrylic acid and methacrylic acid or the metal salt thereof. As the metal forming the metal salt of the α,β-unsaturated carboxylic acid, a monovalent or divalent metal such as zinc, magnesium, calcium, aluminum and sodium is preferably used.

Among them, zinc is preferable, because it can impart the higher repulsion property to the golf ball. The amount of the co-crosslinking agent to be blended in the rubber composition is preferably not less than 20 parts by mass, more preferably not less than 25 parts by mass, and preferably not more than 50 parts by mass, more preferably not more than 40 parts by mass based on 100 parts by mass of the base rubber.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.2 part by mass, more preferably not less than 0.3 part by mass, and preferably not more than 1.5 parts by mass, more preferably not more than 1.0 part by mass based on 100 parts by mass of the base rubber.

The rubber composition for the core and the one-piece golf ball body may further include a diphenyl disulfide or a derivative thereof. The amount of the diphenyl disulfide or the derivative thereof to be blended is preferably 0.1 parts or more, more preferably 0.3 parts or more, and is preferably 5.0 parts or less, more preferably 3.0 pats or less with respect to 100 parts by mass of the base rubber.

The rubber composition for the core and the one-piece golf ball body may further contain a specific gravity adjusting agent such as zinc oxide and barium sulfate, an antioxidant, a color powder, and the like, as required in addition to the base rubber, the co-crosslinking agent, the crosslinking initiator, and diphenyl disulfide or the derivative thereof. The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

When preparing a multi-piece golf ball comprising at least three layers, an intermediate layer is formed between the core and the cover. The intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, and a polyamide elastomer.

Examples of the ionomer resin are one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion. The intermediate layer may further include a gravity adjusting agent such as barium sulfate and tungsten, an antioxidant, a pigment and the like.

A process for preparing a golf ball of the present invention, comprises coating a paint composition to a surface of. a golf ball body, and curing the paint composition to form a paint film, wherein the paint composition includes the aqueous polyol having the carboxyl group, the aqueous polyisocyanate, and the aqueous polycarbodiimide described above. As the process for coating the paint composition, the conventional method can be employed. For example, the aqueous polyol having the carboxyl group, the aqueous polyisocyanate, and the aqueous polycarbodiimide are mixed to prepare the paint composition, and then the paint composition can be applied to the golf ball by the electrostatic coating method, or spray method using an air spray gun. Further, the surface of the golf ball may be subjected to the surface treatment such as cleaning or sandblast prior to the coating.

Subsequently, the paint composition coated on the surface of the golf ball body is dried and cured, for example, at the temperature of 30° C. to 60° C. for 1 to 6 hours to obtain the paint film.

The paint film obtained by curing the above paint composition is preferably a cured product obtainable by reacting the hydroxyl group of the aqueous polyol with the isocyanate group of the polyisocyanate, and further reacting the carboxyl group of the aqueous polyol with the carbodiimide group of the aqueous polycarbodiimide, and more preferably has a main structure of polyurethane obtainable by the reaction between the aqueous polyol and the aqueous polyisocyanate.

The thickness of the paint film after dried and cured, without limitation, is preferably 5 μm or more, more preferably 7 μm or more, and is preferably 25 μm or less, more preferably 18 μm or less. If the thickness is less than 5 μm, the paint film will be easily worn out by the continuous use. While if the thickness is more than 25 μm, the dimple will not work efficiently, thus the flying performance of the resultant golf ball tends to be low.

In addition, the paint film may have a single layer structure or a multi layer structure having at least two layers, as long as the thickness of the paint film falls within the above range. The paint film preferably has the single layer structure, because the painting process can be simplified and the paint film in the present invention shows the excellent paint properties even if the paint film has the single layer structure. The paint film is preferably the outermost clear paint layer.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]

(1) Impact-Resistance of the Paint Film (Durable Adhesion of the Paint Film Against the Impact)

Each painted golf ball was hit 100 times repeatedly with a driver having a metal head attached to a swing robot manufactured by Golf Laboratory CO, at the head speed of 45 m/sec. The peeling condition of the paint film was visually observed and the impact-resistance was evaluated based on the following criteria.

E (Excellent): None of the paint film peeled off.

G (Good): The area where the paint film peeled off was not more than 5% with respect to the whole area of the paint film.

F (Fair): The area where the paint film peeled off was from 5% (exclusive) to 20% with respect to the whole area of the paint film.

P (Poor): The area where the paint film peeled off was more than 20% with respect to the whole area of the paint film.

(2) Wear-Resistance of the Paint Film (Durable Adhesion of the Paint Film Against Frictions)

Each painted golf ball was subjected to brushing wash for 1 hour in the potato peeler having the inside surface covered with the brush. The peeling condition of the paint film was visually observed, and evaluated according to the following criteria.

E (Excellent): None of the paint film peeled off.
G (Good): The area where the paint film peeled off was not more than 5% with respect to the whole area of the paint film.
F (Fair): The area where the paint film peeled off was from 5% (exclusive) to 20% with respect to the whole area of the paint film.
P (Poor): The area where the paint film peeled off was more than 20% with respect to the whole area of the paint film.

[Production of the Two-Piece Golf Ball]

(1) Preparation of Solid Core

The rubber compositions shown in Table 1 were kneaded and pressed with upper and lower molds each having a spherical cavity at the heating condition of 170° C. for 15 minutes to obtain the solid cores A and B in a spherical shape having a diameter of 39.3 mm.

TABLE 1

| Core formulation | A | B |
|---|---|---|
| Polybutadiene rubber | 100 | 100 |
| Zinc acrylate | 33 | 33 |
| Zinc oxide | 5 | 5 |
| Barium sulfate | *2) | *2) |
| Diphenyl disulfide | 0.5 | 0.5 |
| Dicumyl peroxide | 1 | 1 |

Notes on table 1:
*1) Amount: mass part
*2) The amounts were appropriately adjusted to obtain a golf ball having a weight of 45.4 g depending on the type of cover, A or B.
Polybutadiene rubber: BR-11 (cis content: 96%) available from JSR.
Zinc acrylate: "ZNDA-90S" produced by NIHON JYORYU KOGYO.
Zinc oxide: "Ginrei R" produced by Toho-Zinc.
Diphenyl disulfide: Diphenyl disulfide produced by Sumitomo Seika Chemicals, Co,. LTD.
Dicumyl peroxide: "Percumyl D" produced by NOF Corporation.

(2) Preparation of the Cover Material

The materials shown in Table 2 were mixed using a twin-screw kneading extruder to obtain the cover composition in the form of pellet. The extrusion was conducted in the following conditions:

screw diameter=45 mm,
screw revolutions=200 rpm,
screw L/D=35, and
the cover composition was heated to from 200° C. to 260° C. at the die position of the extruder.

TABLE 2

| Cover material | Cover Composition A | Cover Composition B |
|---|---|---|
| HIMILAN 1605 | 50 | — |
| HIMILAN 1706 | 50 | — |
| Elastollan XNY97A | — | 100 |
| Titanium oxide | 4 | 4 |

Notes on Table 2:
Amounts: mass part
HIMILAN 1605: an ionomer resin of a sodium ion-neutralized ethylene-methacrylic acid copolymer, available from MITSUI-DUPONT POLYCHEMICAL.
HIMILAN 1706: an ionomer resin of a zinc ion-neutralized ethylene-methacrylic acid copolymer, available from MITSUI-DUPONT POLYCHEMICAL.
Elastollan XNY97A: a $H_{12}$MDI-PTMG type thermoplastic polyurethane available from BASF Japan.

(3) Preparation of the Golf Ball Body

The cover compositions A and B thus prepared were directly injection-molded onto the cores A and B to form the covers respectively, thereby obtaining the two-piece golf ball bodies each having a diameter of 42.7 mm and a weight of 45.4 g. The upper and lower molds for forming the cover have a spherical cavity with dimples. The part of the dimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

The surface of the obtained golf ball was subjected to the sandblast treatment, the mark was printed, and then the paint compositions shown in Table 3 were coated on the surface of the golf ball body. The painted golf balls were kept in the oven heated at 40° C. for 4 hours to dry and cure the paint compositions, and the paint films having the thickness of about 10 μm were formed. The impact-resistance and wear-resistance of the obtained paint films were evaluated in terms of each golf ball. The results were also shown in Table 3.

TABLE 3

| | | Golf ball No. | | | | | | |
|---|---|---|---|---|---|---|---|---|
| | | No. 1 | No. 2 | No. 3 | No. 4 | No. 5 | No. 6 | No. 7 |
| Core composition/Cover composition | | A/A | B/B | A/A | A/A | A/A | A/A | A/A |
| Paint Composition | | — | — | — | — | — | — | — |
| Base resin | Aqueous polyol having COOH | 100 | 100 | 100 | 100 | 100 | 100 | 100 |
| Curing agent | Aqueous polyisocyanate | 35.5 | 35.5 | 35.5 | 35.5 | 35.5 | 35.5 | — |
| | Aqueous polycarbodiimide | 11.1 | 11.1 | 7.8 | 5.6 | 3.3 | — | 11.1 |
| NCO/OH(molar ratio) | | 1.5 | 1.5 | 1.5 | 1.5 | 1.5 | 1.5 | — |
| NCN/COOH(molar ratio) | | 1.0 | 1.0 | 0.7 | 0.5 | 0.3 | — | 1.0 |

TABLE 3-continued

|  | Golf ball No. | | | | | | |
|---|---|---|---|---|---|---|---|
|  | No. 1 | No. 2 | No. 3 | No. 4 | No. 5 | No. 6 | No. 7 |
| Impact resistance of Paint film | E | E | E | E | G | F | P |
| Wear resistance of Paint film | E | E | G | G | G | F | P |

Notes on table 3
Amounts: mass part
Aqueous polyol: a mixture of an aqueous polyester polyol/an aqueous acrylic polyol (aqueous polyester polyol/acrylic polyol = 4/1, mass ratio) having OH value of 66 mgKOH/g, and acid value of 25 mgKOH/g, available from SHINTO PAINT.
Aqueous polyisocyanate: aqueous hexamethylene diisocyanate (dissolved into 3-methoxybutylacetate, solid content 75%), available from SHINTO PAINT.
Aqueous polycarbodiimide: an aqueous dispersion of the polycarbodiimide having a carbodiimide equivalent of 365 and solid content of 40 mass %, available from NISSHINBO INDUTRIES INC.

Golf balls No. 1 to No. 5 are the cases that the paint film were formed by coating and curing the paint composition to the golf ball body, wherein the paint composition comprises the aqueous polyol having the carboxyl group, the aqueous polyisocyanate, and the aqueous polycarbodiimide. As apparent from table 3, the impact resistance and the wear resistance of the paint film were excellent.

On the other hand, gold balls No. 6 and No. 7 are the case using the paint composition consisting of the aqueous polyol having the carboxyl group and the aqueous polyisocyanate, and the case using the paint composition consisting of the aqueous polyol having the carboxyl group and the aqueous polycarbodiimide, respectively. Both the impact resistance and the wear resistance were lowered. As apparent from the above results, the present invention provides a golf ball having a paint film which is obtained from an environment-friendly aqueous paint and is excellent in the durable adhesion.

This application is based on Japanese Patent application No. 2,005-033,594 filed on Feb. 9, 2005, the contents of which are hereby incorporated by reference.

What is claimed is:

1. A golf ball comprising
a golf ball body, and
a paint film covering the golf ball body, wherein the golf ball body comprises a cover and a resin component constituting the cover, said resin having a urethane bond or a carboxyl group, and the paint film is obtained by curing a paint composition comprising
a water soluble or water dispersible polyol having a carboxyl group,
a water soluble or water dispersible polycarbodiimide having a hydrophilic segment, and
a polyisocyanate modified with polyoxyalkylene ether alcohol to be water soluble or water dispersible.

2. The golf ball according to claim 1, wherein the aqueous polyol having the carboxyl group is a mixture of a water soluble or water dispersible polyester polyol and a water soluble or water dispersible acrylic polyol.

3. The golf ball according to claim 1, wherein the resin having the carboxyl group is an ionomer resin.

4. The golf ball according to claim 1, wherein the resin having the urethane bond is polyurethane.

5. The golf ball according to claim 1, wherein the polycarbodiimide has a carbodiimide equivalent of from 100 to 600.

6. The golf ball according to claim 1, wherein the polyol having the carboxyl group has OH value of from 25 mg KOH/g to 100 mg KOH/g (exclusive).

7. The golf ball according to claim 1, wherein the polyol having the carboxyl group has an acid number of from 10 mg KOH/g to 50 mg KOH/g.

8. The golf ball according to claim 1, wherein the blending ratio of the aqueous polycarbodiimide to the polyol having the carboxyl group is ranging from 0.1 to 1.5 at the molar ratio of a carbodiimide group to a carboxyl group (carbodiimide group/carboxyl group).

9. The golf ball according to claim 1, wherein the polycarbodiimide is a polycarbodiimide resin represented by the following chemical formula (1):

(1)

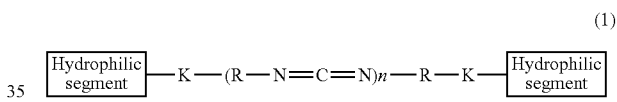

wherein R is a residue where isocyanate groups are removed from diisocyanate, K is a bond formed by a reaction of isocyanate group and a hydrophilic segment, and "n" is an average degree of polymerization and is an integer ranging from 2 to 100.

10. The golf ball according to claim 9, wherein the polycarbodiimide resin is a polytetramethyl xylyene carbodiimide or a polydicyclohexylmethane carbodiimide.

11. A golf ball comprising
a golf ball body, and
a paint film covering the golf ball body, wherein the golf ball comprises a cover, and a resin component constituting the cover, said resin having a urethane bond or a carboxyl group, and the paint film is obtained by curing a paint composition comprising
a water soluble or water dispersible polyol having a carboxyl group with an acid number of from 10 mg KOH/g to 50 mg KOH/g;
a water soluble or water dispersible polycarbodiimide resin having a hydrophilic segment and a carbodiimide equivalent of from 100 to 600, represented by the following formula (1);
a polyisocyanate modified with polyoxyalkylene ether alcohol to be water soluble or water dispersible; and
a blending ratio of the polycarbodiimide resin to the aqueous polyol having the carboxyl group is ranging from 0.1 to 1.5 at a molar ratio of a carbodiimide group to a carboxyl group (carbodiimide group / carboxyl group);

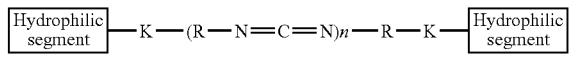
(1)

wherein R is a residue where isocyanate groups are removed from diisocyanate, K means a bond formed by a reaction of isocyanate group and a hydrophilic segment, and "n" means an average degree of polymerization and is an integer ranging from 2 to 100.

12. The golf ball according to claim 11, wherein the resin having the carboxyl group is an ionomer resin.

13. The golf ball according to claim 11, wherein the resin having the urethane bond is polyurethane.

14. The golf ball according to claim 11, wherein the polyol having the carboxyl group has OH value of from 25 mg KOH/g to 100mg KOH/g (exclusive).

15. The golf ball according to claim 11, wherein the polyol having the carboxyl group is a mixture of a water soluble or water dispersible polyester polyol and a water soluble or water dispersible acrylic polyol.

* * * * *